UNITED STATES PATENT OFFICE.

CLAUDE MARIE JOSEPH (DIT CLAUDIUS) LIMB, OF LYONS, FRANCE.

PROCESS OF PRODUCING BARIUM CARBID.

SPECIFICATION forming part of Letters Patent No. 680,050, dated August 6, 1901.

Application filed May 3, 1900. Serial No. 15,353. (No specimens.)

*To all whom it may concern:*

Be it known that I, CLAUDE MARIE JOSEPH (dit CLAUDIUS) LIMB, a citizen of the Republic of France, residing at Caluire-et-Cuire, near Lyons, in the Republic of France, have invented certain new and useful Improvements in or Relating to the Process of Producing Barium Carbid, (for which application has been made in Great Britain under No. 7,282, dated April 19, 1900,) of which the following is a specification.

The present invention relates to the production of metallic carbids, such as barium carbid, from which by simple decomposition baryta and acetylene gas can be obtained.

By submitting to the action of high temperature, such as that of an electric furnace, a mixture of sulfid of barium and carbon mixed with a metal or with a metallic oxid, the said parts being mixed in suitable proportions, barium carbid mixed with the corresponding metallic sulfid will be obtained. It will then be sufficient to treat the product with water, preferably boiling water, to effect decomposition of the carbid into caustic baryta and acetylene gas. The metallic sulfid remains unaltered. The generated acetylene gas may be collected during the operation in any kind of reservoir, such as a gasometer or the like, and it may be compressed after having been suitably purified. It may also be brought into contact with a solvent of any kind—such as, for instance, acetone—or it may be made to react chemically on a substance with a view of obtaining some derived product.

To collect the baryta it will be sufficient to draw off or separate the parts which have not passed through the reaction. On cooling down the baryta separates in a state of crystallized hydrate, which it will be sufficient to isolate and dry in order to obtain a product fit for the market or one which may be used directly. The small remnant of sulfid which has not passed through the reaction may be separated before filtering by the addition of a suitable quantity of a metallic oxid or of iron sulfate or by any other substance producing the same effect.

Barium sulfid is generally obtained by the calcination of a mixture of barium sulfate, natural or artificial, with carbon of any kind or with iron; but the process is evidently applicable to any kind of sulfid, or as an equivalent method to acting upon the preliminarily-prepared sulfid a mixture of sulfate, carbon, and a metal or metallic oxid may at once be subjected to the effects of the furnace. Barium sulfid and barium sulfate may, therefore, be regarded as equivalents for the purposes of this invention.

The mixture of sulfid, carbon, and iron seems to be the most economical; but according to circumstances the metal alone may be employed or a mixture of an iron oxid or of any other metal with carbon may be used, which from the point of view of chemical reaction amounts to the same thing.

Any other metal may be used instead of iron, the choice depending on the special conditions of each case.

In principle a high temperature is required; but the electric furnace has been indicated as specially effective. In making use of it either the caloric effect of the current may be used, in which case the currents may be either continuous or alternating, simple or polyphase, or the electrolytic effect of the current may be used concurrently, in which case the breaking up of the sulfid into its elements is facilitated. In the latter case it is necessary to use a continuous current passing through the mass under treatment. The same process can be applied to the sulfids of strontium and of calcium.

Where reference is made in the following claim to the use of a "metal" in admixture with an alkaline-earth metal, sulfid, and carbon, the term "metal" is to be understood as embracing metal either in its elemental or compound form.

What I claim as my invention, and desire to secure by Letters Patent, is—

The process of producing barium carbid consisting in applying a high temperature, such as that produced by an electric furnace, to a mixture of barium sulfid, carbon and a metal capable of forming a sulfid stable at the temperature of the operation.

In testimony whereof I have signed my name to this specification in the presence of two subscribing witnesses.

CLAUDE MARIE JOSEPH (DIT CLAUDIUS) LIMB.

Witnesses:
   EDWARD P. MACLEAN,
   EMILE LEDRET.